United States Patent
Oh et al.

(10) Patent No.: US 9,604,434 B2
(45) Date of Patent: Mar. 28, 2017

(54) WINDOW FOR DISPLAY DEVICE AND DISPLAY DEVICE INCLUDING THE WINDOW

(71) Applicant: Samsung Display Co., Ltd., Yongin, Gyeonggi-Do (KR)

(72) Inventors: Ju-Suk Oh, Yongin (KR); Yuki Hongo, Yongin (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 641 days.

(21) Appl. No.: 14/014,614

(22) Filed: Aug. 30, 2013

(65) Prior Publication Data
US 2014/0356602 A1 Dec. 4, 2014

(30) Foreign Application Priority Data
May 30, 2013 (KR) ........................ 10-2013-0062050

(51) Int. Cl.
| | |
|---|---|
| B32B 27/08 | (2006.01) |
| B29C 45/14 | (2006.01) |
| B32B 27/36 | (2006.01) |
| B29K 667/00 | (2006.01) |
| B29K 683/00 | (2006.01) |
| B29K 627/06 | (2006.01) |
| B29K 69/00 | (2006.01) |
| B29L 31/34 | (2006.01) |

(52) U.S. Cl.
CPC ........ *B32B 27/08* (2013.01); *B29C 45/14811* (2013.01); *B32B 27/365* (2013.01); *B29C 45/14* (2013.01); *B29K 2069/00* (2013.01); *B29K 2627/06* (2013.01); *B29K 2629/04* (2013.01); *B29K 2667/003* (2013.01); *B29K 2683/00* (2013.01); *B29K 2995/002* (2013.01); *B29L 2031/3475* (2013.01); *B32B 2255/10* (2013.01); *B32B 2457/20* (2013.01); *Y10T 428/24975* (2015.01); *Y10T 428/269* (2015.01); *Y10T 428/31507* (2015.04); *Y10T 428/31786* (2015.04); *Y10T 428/31797* (2015.04); *Y10T 428/31909* (2015.04); *Y10T 428/31938* (2015.04)

(58) Field of Classification Search
CPC .................. B32B 27/08; B32B 27/365; G02B 5/22–5/24; B29C 45/14811; B29C 45/14
See application file for complete search history.

(56) References Cited

U.S. PATENT DOCUMENTS 5,128,389 A * 7/1992 Inukai ...................... C09D 4/00
522/172

FOREIGN PATENT DOCUMENTS

| JP | 2006319251 A | * 11/2006 |
|---|---|---|
| JP | 2007-152886 A | 6/2007 |

(Continued)

OTHER PUBLICATIONS

Machine translation of JP2006-319251. Retrieved Mar. 16, 2016.*
(Continued)

*Primary Examiner* — Prashant J Khatri
(74) *Attorney, Agent, or Firm* — Cantor Colburn LLP

(57) ABSTRACT

A window for a display device, the window including a polymeric substrate, a polymeric layer disposed on a side of the polymeric substrate, and a binder layer interposed between the polymeric substrate and the polymer layer, wherein the binder layer includes a binder and a blue colorant.

16 Claims, 1 Drawing Sheet

(56) References Cited

FOREIGN PATENT DOCUMENTS

| JP | 2010-214601 A | 9/2010 | | |
|---|---|---|---|---|
| KR | 1020080005412 A | 1/2008 | | |
| KR | 1020090054936 A | 6/2009 | | |
| KR | 1020120024656 A | 3/2012 | | |
| WO | WO 0158989 A1 * | 8/2001 | ............. | B32B 27/08 |

OTHER PUBLICATIONS

Kaczmarek et al. "Photochemical reactions in poly(vinyl chloride)/poly(vinyl alcohol) blends". Journal of Photochemistry and Photobiology A: Chemistry, vol. 171, Issue 20, (2005); pp. 187-195.*

"Copper Phthalocyanine". PubChem, retrieved Sep. 4, 2016; pp. 1-35.*

"Indanthrone". PubChem, retrieved Sep. 4, 2016; pp. 1-22.*

* cited by examiner

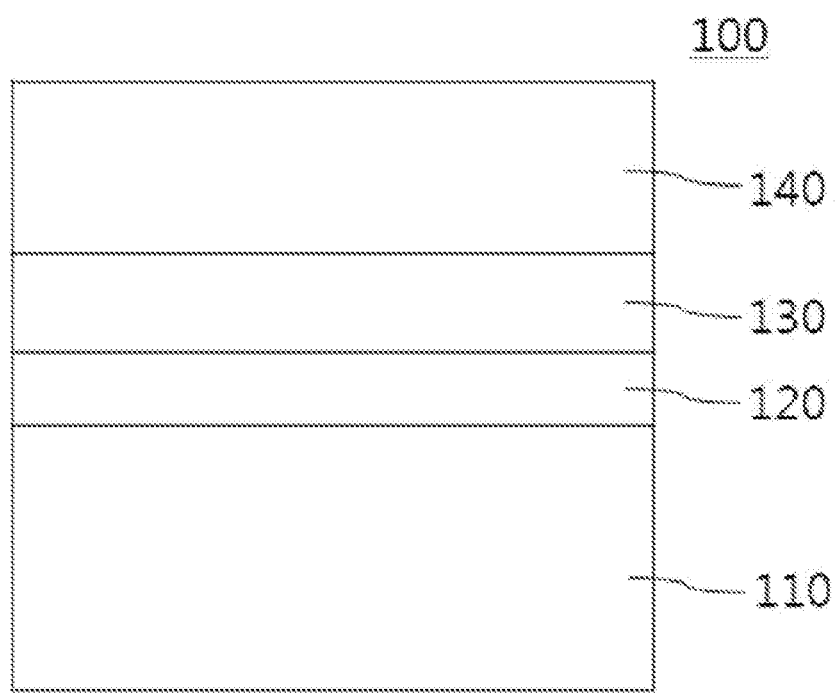

WINDOW FOR DISPLAY DEVICE AND DISPLAY DEVICE INCLUDING THE WINDOW

This application claims priority to and the benefit of Korean Patent Application No. 10-2013-0062050, filed on May 30, 2013, and all the benefits accruing therefrom under 35 U.S.C. §119, the entire content of which is incorporated herein by reference.

BACKGROUND

1. Field

A window for a display device and a display device including the same are disclosed.

2. Description of the Related Art

Currently known display devices include a liquid crystal display ("LCD"), a plasma display panel ("PDP"), an organic light emitting diode display ("OLED"), a field effect display ("FED"), an electrophoretic display device, and the like.

Such a display device includes a display module displaying an image and a window protecting the display module.

Glass may be used as the window.

However, since glass may be easily broken by an external impact, when used in a portable device such as a mobile phone, it may be easily damaged. Therefore, recently, a window made of a plastic material instead of glass is being researched.

The window made of a plastic material may have a stack structure including a polymer resin and a binder. The polymer resin and the binder have a physicochemical characteristic difference and thus, yellowing may occur and deterioration of reliability, from deterioration of adherence between the polymer resin and binder, may occur. Thus there remains a need for an improved window material.

SUMMARY

An embodiment provides a window for a display device capable of improving adherence among a plurality of polymer layers and reliability.

Another embodiment provides a display device including the window.

According to an embodiment, a window for a display device includes a polymeric substrate, a polymer layer disposed on the polymeric substrate, and a binder layer interposed between the polymeric substrate and the polymer layer, wherein the binder layer includes a binder and a blue colorant.

The blue colorant may be present in an amount of about 0.1 weight percent (wt %) to about 50 wt %, based on 100 wt % of the binder.

The blue colorant may be present in an amount of about 5 wt % to about 20 wt %, based on 100 wt % of the binder.

The polymer layer may include a polymer selected from polycarbonate ("PC"), polymethylmethacrylate ("PMMA"), a cycloolefin polymer ("COP"), polyethylene terephthalate ("PET"), a copolymer thereof, and a combination thereof.

The polymer resin layer may have a thickness of about 700 micrometers to about 940 micrometers.

The polymeric substrate may include at least one selected from a polyethylene terephthalate ("PET") film, a polycarbonate ("PC") film, a polymethylmethacrylate ("PMMA") film, a polycarbonate-polymethylmethacrylate ("PC/PMMA") film, and a combination thereof.

The plastic substrate may have a thickness of about 50 μm to about 100 μm, and the binder layer may have a thickness of about 5 μm to about 10 μm.

The window for a display device may further include a hard coating layer disposed on a side of the polymeric substrate.

The hard coating layer may include at least one selected from an organic material, an inorganic material, and an organic/inorganic composite compound.

The hard coating layer may have a surface hardness of greater than or equal to about 4H.

The hard coating layer may have a thickness of about 5 μm to about 200 μm.

The polymeric substrate, the binder layer, and the polymer layer may be an In mold decoration ("IMD") film.

Also disclosed is a method of manufacturing a window for a display device, the method including: film insert injection molding a polymeric substrate, a binder layer, and a polymeric layer to provide the window disclosed above.

The window for a display device may be obtained by injection molding the polymeric substrate, the binder layer, and the polymer layer in a film insert method.

The window for a display device may have a Yellowness Index ("YI") of less than or equal to about 1.50.

The window for a display device may have a Yellowness Index ("YI") of less than or equal to about 1.0.

The window for a display device may have a thickness of less than or equal to about 1 millimeter (mm).

According to another embodiment, a display device including the window for a display device is provided.

Adherence between a polymer resin layer and a polymeric substrate including the window for a display device may be improved and simultaneously, yellowing of the window for a display device may be prevented, and its reliability may be improved.

BRIEF DESCRIPTION OF THE DRAWINGS

The above and other aspects, advantages and features of this disclosure will become more apparent by describing in further detail exemplary embodiments thereof with reference to the accompanying drawings, in which:

FIG. 1 is a cross-sectional view of an embodiment of a window for a display device.

DETAILED DESCRIPTION

The invention now will be described more fully hereinafter with reference to the accompanying drawings, in which various embodiments are shown. Exemplary embodiments will hereinafter be described in further detail. However, this disclosure may, however, be embodied in many different forms and is not construed as limited to the exemplary embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it may be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the FIGURES. It will be understood that the spatially relative terms are intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Referring to FIG. 1, a window for a display device according to an embodiment will be further disclosed.

FIG. 1 is a cross-sectional view of a window for a display device according to one embodiment.

A window 100 for a display device according to an embodiment includes a polymer layer, i.e., a polymer resin layer 110, a polymeric substrate 130 disposed on a side of the polymer resin layer 110, and a binder layer 120 interposed between the polymeric substrate 130 and the polymer resin layer 110. The window 100 may further comprise a hard coating layer 140 on the polymeric substrate 130.

The polymeric substrate 130 may be in the form of a film used for a film insert forming process, and may comprise, for example a polymer selected from polyethylene terephthalate ("PET"), polycarbonate ("PC"), polymethylmethacrylate ("PMMA"), a polycarbonate-polymethylmethacrylate ("PC/PMMA") composition, and a combination thereof. The polycarbonate-polymethylmethacrylate composition may be a blend, a copolymer, or a laminate, for example.

The polymeric substrate 130 may comprise, for example, a polyethylene terephthalate ("PET") film, a polycarbonate ("PC") film, a polymethylmethacrylate ("PMMA") film, a polycarbonate/polymethylmethacrylate ("PC/PMMA") film, and a combination thereof. The polymeric substrate 130 may have a thickness, for example, of about 10 micrometers (μm) to about 100 μm, specifically about 50 micrometers (μm) to about 100 μm.

The polymer resin layer 110 may comprise an injection moldable polymer, i.e., a polymer resin, and the injection moldable polymer resin may comprise, for example one selected from polycarbonate ("PC"), polymethylmethacrylate ("PMMA"), a cycloolefin polymer ("COP", e.g., ethylene-norbornene copolymer), polyethylene terephthalate ("PET"), a copolymer thereof, and a combination thereof. Herein, the 'combination' may refer to a blend or a stack, e.g., a laminate, of two or more layers.

The polymer resin layer 110 may have a thickness, for example, of about 500 μm to about 1000 μm, specifically about 700 μm to about 940 μm. When the polymer resin layer 110 has a thickness within the range, a sufficient space for inflow of the polymer resin in a film insert manner during the injection molding may be provided, resulting in satisfactory appearance of a window as well as suitable impact resistance and surface hardness characteristics of the polymer resin.

The binder layer 120 is a layer that is disposed between the polymeric substrate 130 and the polymer resin layer 110 and binds the polymeric substrate 130 to the polymer resin layer 110. The binder layer 120 may comprise a binder, i.e., a binder resin, and a blue colorant. More specifically, the binder layer 120 may comprise the binder resin, the blue colorant, and a solvent.

The binder resin may comprise any suitable binder having suitable binding characteristics without limitation, and may be, for example a two-component curable resin, an acryl-based binder, a PVA/PVC resin, and the like.

The blue colorant may be a blue or bluish pigment, or a dispersion wherein the pigment is dispersed in a solvent, and the pigment may include, for example a pigment selected from a blue organic pigment, a blue inorganic pigment, and a combination thereof. Specifically, the blue or bluish pigment may comprise, for example, a pigment selected from C.I. pigment blue No. 15, C.I. pigment blue No. 15:3, C.I. pigment blue No. 15:4, C.I. pigment blue No. 15:6, C.I. pigment blue No. 60, an indanthrone compound represented by Chemical Formula 1, a Cu-phthalocyanine compound represented by Chemical Formula 2, and a combination thereof, wherein "C.I." refers to color index constitution numbers maintained by the American Association of Textile Chemists and Colorists.

Chemical Formula 1

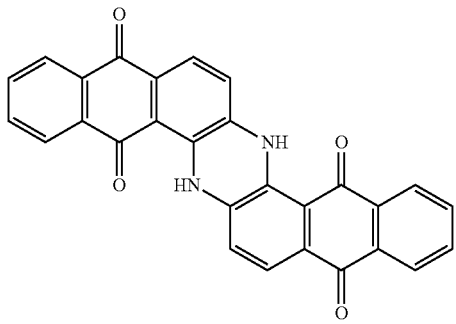

Chemical Formula 2

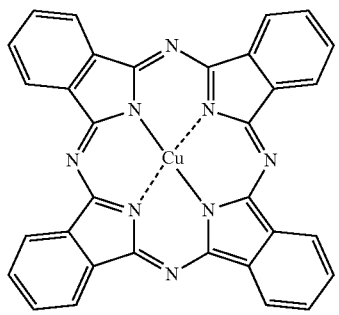

The blue or bluish pigment may be dispersed in the binder resin. Specifically, the blue or bluish pigment may be dispersed in a solvent including the binder resin. The binder resin may include, for example, a polyvinyl alcohol-polyvinyl chloride ("PVA/PVC") having a suitable molecular weight, e.g., a number average molecular weight of about 10,000 to about 150,000 Daltons; and a suitable hydroxyl ("OH") value, e.g., an OH value of about 10 to about 100 mgKOH/g, and the solvent may include, for example, cyclohexanone for dispersion workability. The blue or bluish pigment may be dispersed in the binder resin by dispersing a mill base prepared by pre-mixing the blue or bluish pigment in the solvent including the PVA/PVC resin with a ring mill for about 1 to about 3 hours. Specifically, about 30 weight percent (wt %) to about 50 wt % of the PVA/PVC resin, about 30 wt % to about 65 wt % of the cyclohexanone solvent, and about 5 wt % to about 20 wt % of the blue colorant may be used.

The blue colorant modifies a yellowness index ("YI") of a product obtained by injection-molding the polymeric substrate 130, the binder layer 120, and the polymer resin layer 110 in a film insert manner, as is further disclosed below. For example, the injection-molded product has a yellowness index ("YI") of less than or equal to about 1.50 and specifically, less than or equal to about 1.0. Accordingly, yellowing of a window for a display device is reduced or effectively prevented, and then, its transmittance characteristic is improved.

In addition, the blue colorant may increase adherence between the polymeric substrate 130 and the polymer resin layer 110 during the injection molding of the polymeric substrate 130, the binder layer 120, and the polymer resin layer 110 in a film insert manner. Accordingly, reliability of a window for a display device may be improved.

The blue colorant may be included, e.g., dispersed, in an amount of about 0.1 wt % to about 50 wt %, based on 100 wt % of the binder resin. When the blue colorant is included within the range, yellowing is effectively prevented, and its transmittance characteristic is improved. Specifically, the blue colorant may be dispersed in an amount of about 5 wt % to about 20 wt %, based on 100 wt % of the binder resin.

The binder layer 120 may have a thickness, for example, of about 1 μm to about 20 μm, specifically about 5 μm to about 10 μm.

The coating layer, i.e., the hard coating layer 140, may be disposed on one side of the polymeric substrate 130. The hard coating layer 140 may include, for example an organic material, an inorganic material, or an organic-inorganic composite compound. Herein the organic material may include, for example an acryl-based compound, an epoxy-based compound, or a combination thereof, the inorganic material may include, for example silica, alumina, or a combination thereof, and the organic/inorganic composite compound may include, for example a polysilsesquioxane. The hard coating layer 140 may comprise a monolayer or a plurality of layers, and may have a thickness, for example of about 5 μm to about 200 μm.

The hard coating layer 140 may have surface hardness of greater than or equal to about 4H. The surface hardness may be measured by applying a load of 1 kg with a pencil hardness tester (e.g., using a BMS Tech hardness tester). With the surface hardness within the foregoing range, surface scratches may be prevented or reduced.

The hard coating layer 140 may be disposed on the uppermost layer of a window 100 for a display device and may improve surface hardness of the window. Herein, the hard coating layer 140 may be disposed on the uppermost layer of a window 100 for a display device and thus, can directly influence the surface hardness of the window. Also, an additional layer maybe disposed thereon to provide an additional function. For example, an antireflective film may be disposed thereon.

The hard coating layer 140 may be omitted if desired.

The polymeric substrate 130, the binder layer 120, and the polymer resin layer 110 may be, for example an In-mold decoration ("IMD") film.

The window 100 for a display device may be obtained by injection molding the polymeric substrate 130, the binder layer 120, and the polymer resin layer 110 in a film insert method.

According to on embodiment, the polymeric substrate 130 and binder layer 120 may be disposed on a side of the polymer resin layer 110, and may be disposed on both sides of the polymer resin layer 110.

The window 100 for a display device may have a thickness of less than or equal to about 1 millimeter mm, specifically a thickness of about 0.1 mm to about 1 mm.

The window for a display device may be applied to various display devices. The display device may be a liquid crystal display ("LCD"), an organic light emitting diode ("OLED") display, a plasma display, an electric field effect display device, an electrophoresis display device, and the like, but is not limited thereto.

The window for a display device may be disposed on a display module, wherein the display module may be a liquid crystal display module, an organic light emitting display module, a plasma display module, an electric field effect display module, an electrophoresis display module, and the like.

Hereinafter, the present disclosure is illustrated in more detail with reference to examples. However, these examples are exemplary, and the present disclosure is not limited thereto.

EXAMPLES

Preparation of Binder Dispersion

Preparation Example 1

A binder solution was prepared by adding 40 wt % of a PVA/PVC resin (IMB00002, Teikoku Printing Inks Mfg. Co., Ltd.) and 10 wt % of a blue pigment (CSNN Blue, Haubech) to 50 wt % of a cyclohexanone solvent (CAS. No: 108-94-1), each based on a total weight of the binder solution, and dispersing the mixture with a ring mill for 2 hours using a chiller temperature of 30° C., RPM of 1500, and a bead size of 100 μm.

Preparation Example 2

A binder solution was prepared according to the same method as Preparation Example 1 except for using 5 wt % of the blue pigment (CSNN Blue, Haubech) instead of 10 wt % of the blue pigment.

Preparation Example 3

A binder solution was prepared according to the same method as Preparation Example 1 except for using 20 wt % of the blue pigment (CSNN Blue, Haubech) instead of 10 wt % of the blue pigment.

Comparative Preparation Example 1

A binder solution was prepared by adding 50 wt % of a binder resin (IMB00002, Teikoku Printing Inks Mfg. Co., Ltd.) to 50 wt % of a cyclohexanone solvent (CAS. No: 108-94-1), each based on a total weight of the binder solution.

Comparative Preparation Example 2

A binder solution was prepared by adding 40 wt % of a PVA/PVC resin (IMB00002, Teikoku Printing Inks Mfg. Co., Ltd.) and 10 wt % of white pigment (R-902, Dupont Co. Ltd.) to 50 wt % of a cyclohexanone solvent (CAS. No: 108-94-1), each based on a total weight of the binder solution, and dispersing the mixture with a ring mill for 2 hours using a chiller temperature of 30° C., RPM of 1500, a bead size of 100 μm.

Manufacture of Window for Display Device

Example 1

A polysilsesquioxane solution (Radisol-S, Songwon SC Corp.) was coated on a PET film (PET100A4300, TOYOBO Co., Ltd.), dried at 80° C. for 1 minute, and cured by radiating an ultraviolet (UV) ray at 300 mJ/cm². Subsequently, the binder solution according to Preparation Example 1 was coated on the other side of the PET film and dried at 100° C. for 10 minutes. Subsequently, the dried PET film was pre-cured at 100° C. Subsequently, the pre-cured PET film was put in an injection molder to injection-mold the following polycarbonate (PC) (HFD1810, Sabic Industries Corp.), manufacturing a 1 mm-thick window for a display device including a 0.79 mm-thick polycarbonate ("PC") resin layer. Each layer has a thickness as follows.
Hard coating layer: 0.15 mm
PET film: 0.05 mm
Binder layer: 0.01 mm
Polycarbonate ("PC") resin layer: 0.79 mm Example 2

A 1 mm-thick window for a display device was manufactured according to the same method as Example 1 except for using the binder solution according to Preparation Example 2 instead of the binder solution according to Preparation Example 1. Each layer has a thickness as follows.
Hard coating layer: 0.15 mm
PET film: 0.05 mm
Binder layer: 0.01 mm
Polycarbonate ("PC") resin layer: 0.79 mm Example 3

A 1 mm-thick window for a display device was manufactured according to the same method as Example 1 except for using the binder solution according to Preparation Example 3 instead of the binder solution according to Preparation Example 1. Each layer has a thickness as follows.
Hard coating layer: 0.15 mm
PET film: 0.05 mm
Binder layer: 0.01 mm
Polycarbonate ("PC") resin layer: 0.79 mm Comparative Example 1

A 1 mm-thick window for a display device was manufactured according to the same method as Example 1 except for using the binder solution according to Comparative Preparation Example 1 instead of the binder solution according to Preparation Example 1. Each layer has a thickness as follows.
Hard coating layer: 0.15 mm
PET film: 0.05 mm
Binder layer: 0.01 mm
Polycarbonate ("PC") resin layer: 0.79 mm Comparative Example 2

A 1 mm-thick window for a display device was manufactured according to the same method as Comparative Example 1 except for using a polymethylmethacrylate ("PMMA") resin layer instead of the polycarbonate ("PC") resin layer. Each layer has a thickness as follows.
Hard coating layer: 0.15 mm
PET film: 0.05 mm
Binder layer: 0.01 mm
Polymethylmethacrylate ("PMMA") resin layer: 0.79 mm Comparative Example 3

A 1 mm-thick window for a display device was manufactured according to the same method as Example 1 except for using the binder solution according to Comparative Preparation Example 2 instead of the binder solution according to Preparation Example 1. Each layer has a thickness as follows.
Hard coating layer: 0.15 mm
PET film: 0.05 mm
Binder layer: 0.01 mm
Polycarbonate ("PC") resin layer: 0.79 mm Evaluation The optical characteristics (Yellowness Index, YI) and reliability (adherence) of the windows for a display device according to Examples 1 to 3 and Comparative Examples 1 to 3 were evaluated.

The YI was measured by using MINOLTA CM-3600D. The Yellowness Index was measured in a D1925 illuminant 550 nm region.

The adherence was evaluated by examining if a film was peeled off or not with naked eyes at 85° C. under humidity of 85% at each hour (0 h (initial time), 24 h, 48 h, 72 h, 96 h, 120 h).

The results are provided in Table 1.

TABLE 1

| | Binder solution | Hardness of hard coating layer | Polymer resin | Light transmittance film thickness (mm) | Window thickness (mm) | Optical characteristics YI | Characteristics (Adherence) reliability (85° C./85%) | | | | | |
|---|---|---|---|---|---|---|---|---|---|---|---|---|
| | | | | | | | Initial (0 HR) | 24 HR | 48 HR | 72 HR | 96 HR | 120 HR |
| Ex 1 | Preparation Example 1 | 8H | PC | 0.21 | 1 | 0.52 | OK | OK | OK | OK | OK | OK |
| Ex 2 | Preparation Example 2 | 8H | PC | 0.21 | 1 | 0.98 | OK | OK | OK | OK | OK | OK |
| Ex 3 | Preparation Example 3 | 8H | PC | 0.21 | 1 | 0.23 | OK | OK | OK | OK | OK | OK |
| CEx 1 | Comparative Preparation Example 1 | 8H | PC | 0.21 | 1 | 2.02 | OK | OK | OK | NG | NG | NG |
| CEx 2 | Comparative Preparation Example 1 | 8H | PMMA | 0.21 | 1 | 1.73 | OK | OK | NG | NG | NG | NG |
| CEx 3 | Comparative Preparation Example 2 | 8H | PC | 0.21 | 1 | 1.62 | OK | OK | OK | OK | OK | OK |

In Table 1, Example is abbreviated "Ex" and Comparative Example is abbreviated "CEx."

Referring to Table 1, the windows for a display device according to Examples 1 to 3 showed excellent optical characteristics and (adherence) reliability. On the contrary, the windows for a display device using a binder prepared by dispersing no blue pigment according to Comparative Examples 1 and 2 showed insufficient optical characteristics and (adherence) reliability, and the window for a display device using a binder prepared by dispersing a white pigment according to Comparative Example 3 showed satisfactory adherence characteristic but insufficient optical characteristics. These results show that a polymeric window including a binder comprising a blue pigment provided improved optical characteristics, hardness, and (adherence) reliability.

While this disclosure has been described in connection with what is presently considered to be practical exemplary embodiments, it is to be understood that the invention shall not limited to the disclosed embodiments, but, on the contrary, is intended to cover various modifications and equivalent arrangements included within the spirit and scope of the appended claims.

What is claimed is:

1. A window for a display device, the window comprising a polymeric substrate,
a polymer layer disposed on a side of the polymeric substrate, and
a binder layer interposed between the polymeric substrate and the polymer layer, wherein the binder layer comprises a binder and a blue colorant, wherein the blue colorant comprises one selected from a compound represented by Chemical Formula 1, a compound represented by Chemical Formula 2, and a combination thereof:

Chemical Formula 1

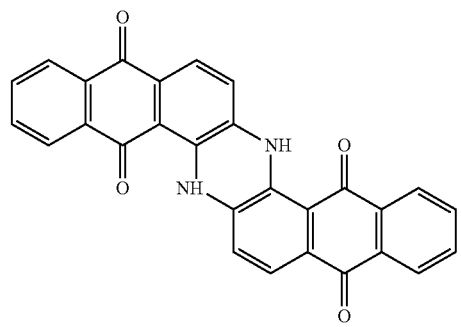

Chemical Formula 2

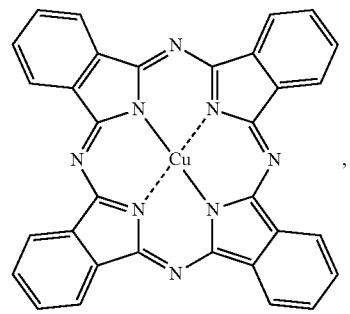

wherein the blue colorant is present in an amount of about 5 weight percent to about 20 weight percent, based on 100 weight percent of the binder, and
wherein the window for a display device has a Yellowness Index of less than or equal to about 1.00.

2. The window for a display device of claim 1, wherein the polymer layer comprises a polymer selected from polycarbonate, polymethylmethacrylate, a cycloolefin polymer, polyethylene terephthalate, a copolymer thereof, and a combination thereof.

3. The window for a display device of claim 1, wherein the polymer layer has a thickness of about 700 micrometers to about 940 micrometers.

4. The window for a display device of claim 1, wherein the polymeric substrate comprises a polymer selected from polyethylene terephthalate, polycarbonate, polymethylmethacrylate, a polycarbonate-polymethylmethacrylate composition, and a combination thereof.

5. The window for a display device of claim 1, wherein the polymeric substrate has a thickness of about 50 micrometers to about 100 micrometers, and
wherein the binder layer has a thickness of about 5 micrometers to about 10 micrometers.

6. The window for a display device of claim 1, further comprising a coating layer disposed on a side of the polymeric substrate.

7. The window for a display device of claim 6, wherein the coating layer comprises one selected from an organic material, an inorganic material, an organic-inorganic composite, and a combination thereof.

8. The window for a display device of claim 6, wherein the coating layer has a surface hardness of greater than or equal to about 4H.

9. The window for a display device of claim 6, wherein the coating layer has a thickness of about 5 micrometers to about 200 micrometers.

10. The window for a display device of claim 1, wherein the polymeric substrate, the binder layer, and the polymer layer is an in-mold decoration film.

11. The window for a display device of claim 1, wherein the window for a display device has a thickness of less than or equal to about 1 millimeter.

12. A display device comprising the window for a display device of claim 1.

13. The window for a display device of claim 1, wherein the polymeric substrate is in the form of a film.

14. The window for a display device of claim 1, wherein the binder is a two-component curable resin.

15. The window for a display device of claim 1, wherein the binder is a polyvinyl alcohol-polyvinyl chloride resin having a number average molecular weight of about 10,000 to about 150,000 Daltons.

16. A method of manufacturing a window for a display device, the method comprising:
film insert injection molding a polymeric substrate, a binder layer, and a polymeric layer to provide the window of claim 1.

* * * * *